United States Patent [19]

Okamoto et al.

[11] Patent Number: 5,504,673
[45] Date of Patent: Apr. 2, 1996

[54] MICROPROGRAM LOAD UNIT

[75] Inventors: Tadashi Okamoto; Hiromasa Yamaoka, both of Hitachi; Kazuhiko Shimoyama, Katsuta, all of Japan

[73] Assignee: Hitachi, Ltd., Tokyo, Japan

[21] Appl. No.: 246,721

[22] Filed: May 20, 1994

Related U.S. Application Data

[63] Continuation of Ser. No. 942,145, Sep. 8, 1992, abandoned, which is a continuation of Ser. No. 768,322, Aug. 22, 1985, Pat. No. 5,237,687.

[30] Foreign Application Priority Data

Aug. 31, 1984 [JP] Japan ................. 59-180587

[51] Int. Cl.[6] .................. G06F 19/00; G06F 12/16
[52] U.S. Cl. ............. 364/187; 395/182.04; 364/DIG. 1; 364/268.5; 364/285.1; 364/273.4; 364/DIG. 2; 364/948.4; 364/975.2
[58] Field of Search ................... 364/184, 185, 364/186, 187, DIG. 1, DIG. 2; 371/8.1, 10.1, 66; 395/575, 700, 750, 182.04, 182.05; 365/228, 229

[56] References Cited

U.S. PATENT DOCUMENTS

| | | | |
|---|---|---|---|
| 4,327,410 | 4/1982 | Patel | 364/DIG. 1 |
| 4,393,500 | 7/1983 | Imazeki et al. | 371/66 X |
| 4,458,307 | 7/1984 | McAnlis et al. | 364/DIG. 1 |
| 4,491,914 | 1/1985 | Sujaku | 364/DIG. 1 |
| 4,523,295 | 6/1985 | Zato | 364/DIG. 2 |
| 4,564,922 | 1/1986 | Muller | 364/DIG. 2 |
| 4,584,663 | 4/1986 | Tanikawa | 365/228 X |
| 4,626,986 | 12/1986 | Mori | 364/DIG. 2 |
| 4,648,066 | 3/1987 | Pitt | 364/DIG. 2 |
| 5,237,687 | 8/1993 | Okamoto et al. | 364/DIG. 1 |

OTHER PUBLICATIONS

Hayes, *Computer Architecture and Organization*, Second Edition, 1988–McGraw–Hill, Inc. pp. 376–383.

Primary Examiner—Joseph Ruggiero
Attorney, Agent, or Firm—Antonelli, Terry, Stout & Kraus

[57] ABSTRACT

A microprogram load unit comprising a readable and writable microprogram memory within a central processor unit for storing microprogram, a relatively low speed, readable and writable, nonvolatile memory unit, and a readable and writable memory with battery backup. It is determined whether data of the readable and writable memory with backup has been lost or not when power is turned on. If data loss is not present, microprogram is read out of the readable and writable memory with backup and written into the microprogram memory. If data loss is present, microprogram is read out of the nonvolatile memory unit and is written into the microprogram memory.

5 Claims, 3 Drawing Sheets

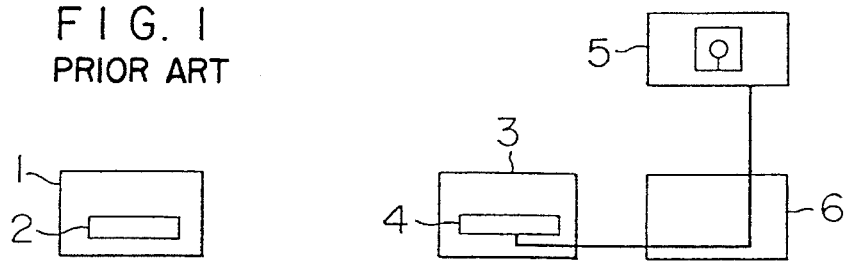
FIG. 1 PRIOR ART
FIG. 2 PRIOR ART
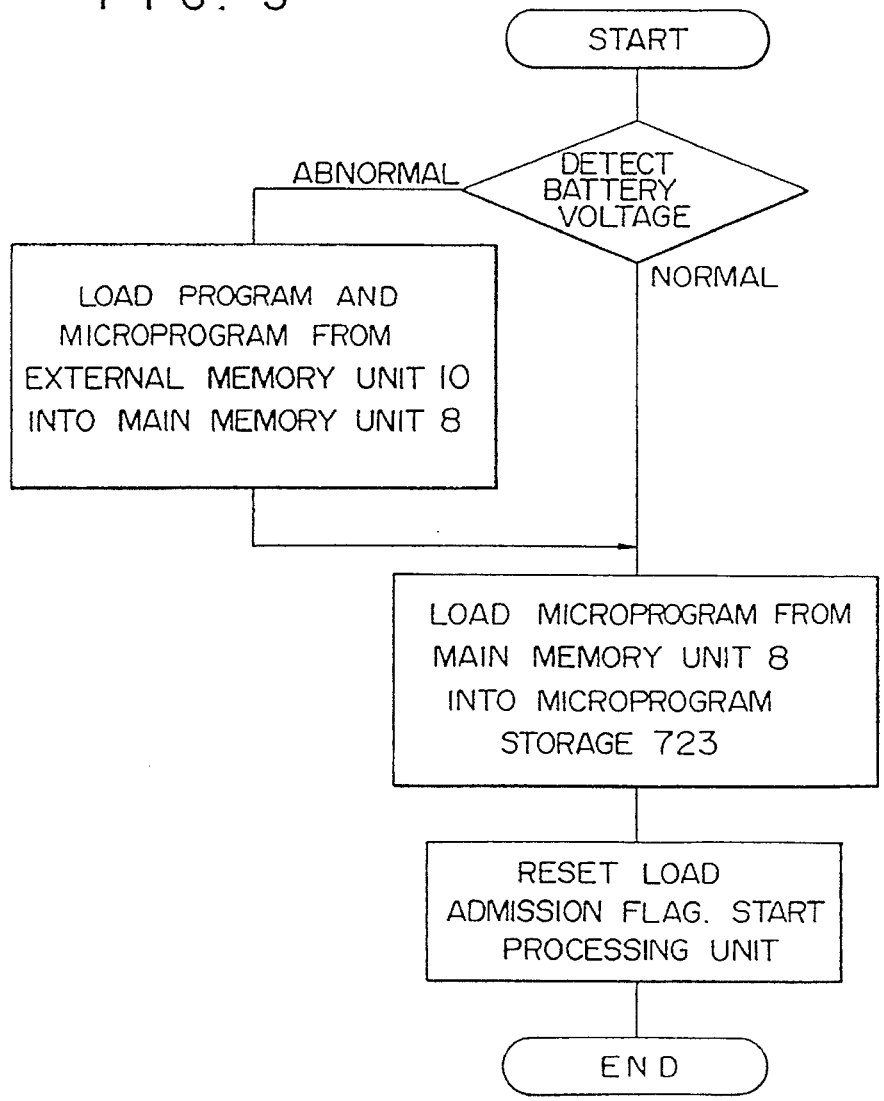
FIG. 5

MICROPROGRAM LOAD UNIT

This application is a continuation of application Ser. No. 07/942,145, filed Sep. 8, 1992, now abandoned, which is a continuation of application Ser. No. 06/768,322, filed Aug. 22, 1985, now U.S. Pat. No. 5,237,687.

BACKGROUND OF THE INVENTION

1. Field of the Invention

The present invention relates to a programmable controller used for process control of a plant, and in particular to a microprogram load unit of a programmable controller which can be suitably used for high speed, highly functional control.

2. Description of Related Art

Programmable controllers were used for effecting simple sequence control at the beginning. In recent years, however, programmable controllers have been highly improved in speed, function and reliability. With the expansion in application field, therefore, improvement in function of an existing controller, minimization in its down time, and installation of a controller at the field have been demanded.

In a typical conventional method, the microprogram is stored in a microprogram read only memory without using loading. In this method, however, it is impossible to load a microprogram containing a new function, enhancement in controller function being obviated.

In a method adopted to avoid the above described drawback, a program transfer unit transfers a microprogram from a nonvolatile memory comprising a relatively large-capacity mechanical part such as a flexible disk to a readable/writable microprogram memory. This method is relatively simple. Because of use of the mechanical part in the nonvolatile memory, however, it is necessary to maintain a good environment by using air conditioning. Therefore, application of the method has been limited to units installed in places with good surroundings such as an office computer. One of such units is a microprogram load unit proposed in Japanese Patent Unexamined Publication No. 146547/79. In this unit, the transfer of the microprogram to the control unit at the time of power turn on or initialization is effected from the disk unit without being passed through the floppy disk unlike the prior art. Since this unit uses a magnetic disk unit including mechanical parts, it must be installed in a place with good surroundings. Further, due to use of the mechanical parts, the program readout speed is slow, resulting in drawbacks that it takes a long time for loading and the down time caused by power down is prolonged.

Further, although the microprogram can be written into or read out of the memory contained in the controller at high speed, a large amount of power dissipation is incurred to attain the high speed. And a battery backup is not provided for power down.

SUMMARY OF THE INVENTION

An object of the present invention is to eliminate the above described problem of the prior art and provide a microprogram load unit which is capable of loading the microprogram at high speed so that the CPU of the programmable controller may be set to the ready state on the instant that the power is turned on again and which obviates the necessity of permanently installing a memory unit composed of mechanical parts.

Another object of the present invention is to provide a microprogram load unit which enables to read data out of or write into the memory of the programmable controller and which can be easily improved in function by rewriting the microprogram at the field where the controller is used.

In a microprogram load unit according to the present invention, there is provided a readable and writable IC memory which is relatively low in speed, and hence low in power dissipation as compared with the memory of the CPU within the programmable controller. The microprogram to be loaded into the memory of the CPU at the time of power restoration is stored in the IC memory. The readable and writable IC memory has a battery backup. It is determined whether data within the readable and writable IC memory has been lost or not when power is turned on,. Unless the data has been lost, the microprogram within the readable and writable IC memory is loaded into the CPU memory. If the data has been lost, microprogram is loaded from a nonvolatile memory unit which is separately provided.

It is determined whether the data within the readable and writable IC memory has been lost or not, depending upon whether the battery backup is normally functioning or whether the memory contents at a predetermined memory location of the IC memory are normal.

The read/write speed of the readable and writable IC memory is far faster than that of the nonvolatile memory unit. By using such an IC memory, therefore, it is possible to make the CPU rise at high speed when power is returned to the normal state. It is not necessary to provide the nonvolatile memory unit so as to form a pair with the readable and writable IC memory all the time. Instead, the nonvolatile memory unit may be normally stored in a place with good surroundings. If the data of the readable and writable IC memory has been lost when power is turned on, the nonvolatile memory unit may be brought to the vicinity of the controller to load the microprogram from the memory unit into the CPU memory.

It is possible to use a low-speed IC memory as the main memory unit in the programmable controller and use a part of the memory area of the main memory unit as the readable and writable IC memory.

In accordance with the present invention, it is possible to carry out microprogram loading at high speed and reduce the system down time by adding an inexpensive IC memory with battery backup. In addition, it can be easily attained to enhance the function at the field where the controller is used, i.e., to rewrite the microprogram. Further, since a relatively expensive memory unit such as a flexible disk need not be always provided, it can be commonly used for a plurality of controllers and can be stored in a place with good surroundings in the normal state.

BRIEF DESCRIPTION OF THE DRAWINGS

These and other objects and advantages of the present invention will become apparent by reference to the following description and accompanying drawings wherein:

FIG. 1 shows the configuration of a programmable controller according to the prior art which uses a microprogram read only memory;

FIG. 2 shows the configuration of a programmable controller according to the prior art which uses a nonvolatile memory as a loading memory when power is restored;

FIG. 5 is a flow chart for illustrating the operation of the programmable controller shown in FIG. 3.

DESCRIPTION OF THE PREFERRED EMBODIMENT

Prior to description of a preferred embodiment of the present invention, the configuration of the prior art will now be described.

FIG. 1 shows the configuration of a scheme wherein the microprogram is stored into a microprogram read only memory and microprogram loading is not carried out. In a CPU 1 of a programmable controller illustrated in FIG. 1, the microprogram is stored in a microprogram read only memory 2. Although this scheme is very simple, it is extremely difficult to enhance its functions.

FIG. 2 shows the configuration of an example of a scheme wherein a nonvolatile memory is used as a loading memory when power is restored. In a CPU 3 of a programmable controller illustrated in FIG. 2, a microprogram memory 4 is readable and writable. When power has been restored, a program transfer unit 6 transfers the microprogram from a flexible disk 5 to a microprogram memory 4. This scheme is relatively simple. Since mechanical parts are used in the nonvolatile memory, the memory must be installed in a place with relatively good surroundings. Further, since the read/ write speed of the memory is slow, the down time of the programmable controller becomes long.

Figure 3:
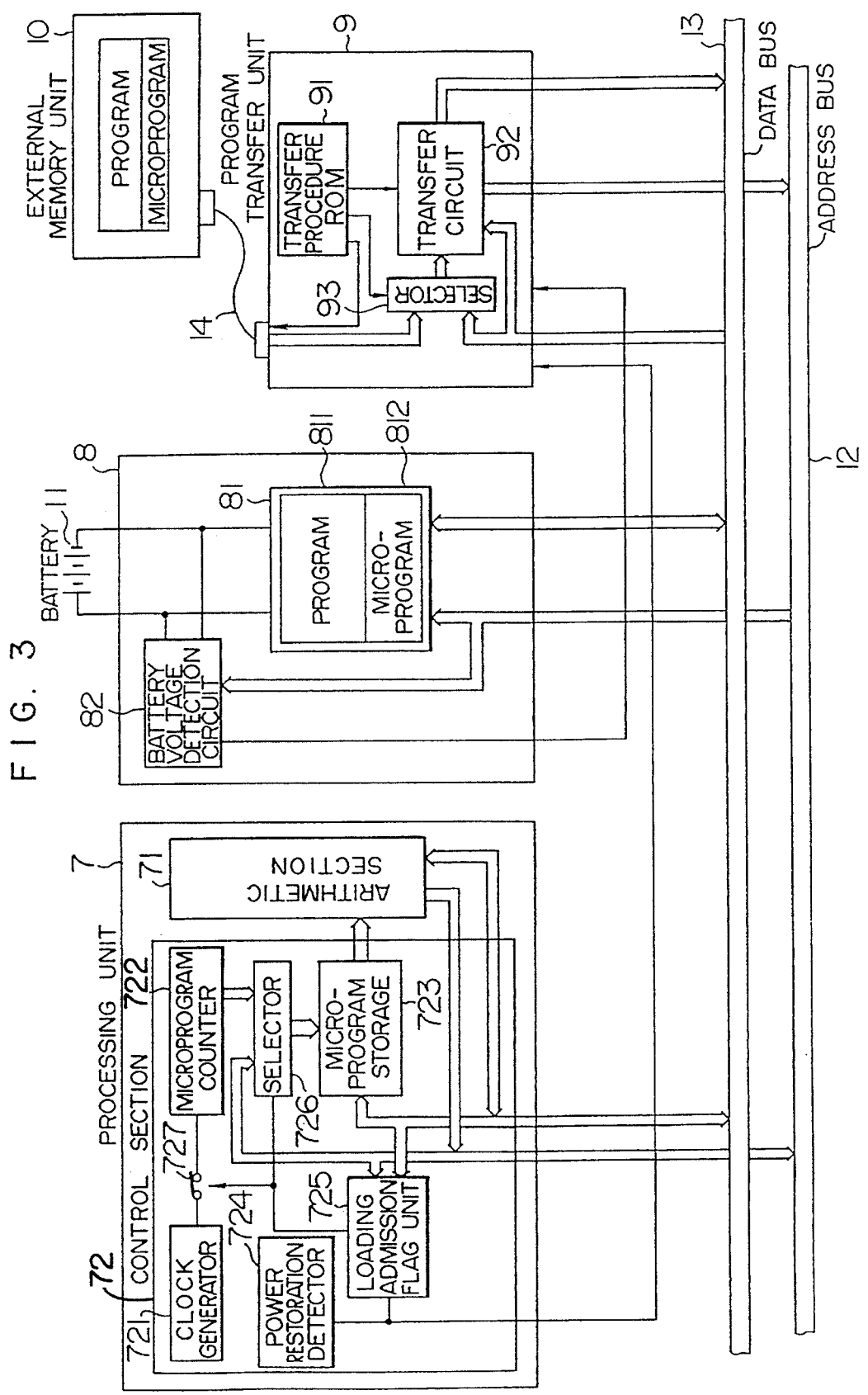
FIG. 3 is a block diagram showing the configuration of a programmable controller according to the present invention.

The present invention provides a programmable controller which is free of problems of the prior art. FIG. 3 shows the configuration of an embodiment of a programmable controller according to the present invention.

As shown in FIG. 3, a microprogram load unit according to the present invention comprises a processing unit 7, a main memory unit 8, a program transfer unit 9, and an external memory 10, The processing unit 7 includes an arithmetic section 71 and a control section 72 which controls the arithmetic section 71. A clock generator 721, a microprogram counter 722, and a microprogram storage 723 are included in the control section 72 as basic components for controlling the microprogram scheme.

In the processing unit, the microprogram counter 722 is updated according to clocks generated by the clock generator 721. According to the count value, the contents stored in the microprogram storage 723, i.e., the microprogram written in the storage beforehand is read out step by step to control the arithmetic section 7. Normally, a selector 726 supplies the count value of the microprogram counter 722 to the microprogram storage 723 as its address. This is the basic operation of the control section 72 in the microprogram scheme.

The microprogram storage 723 is a high speed volatile memory and its contents are destroyed by a failure of power supply. A power restoration detector 724 and a loading admission flag unit 725 are provided in the control section 72. When power is restored, it is detected by the power restoration detector 724 to set the loading admission flag unit 725. Under the control from the loading admission flag unit 725, the selector 726 switches the address source of the microprogram storage 723 from the microprogram counter 722 to the outside to enable loading of the microprogram supplied from the outside of the processing unit 7 into the microprogram storage 723.

Under the control from the loading admission flag unit 725, a clock admission switch 727 is turned off to stop the microprogram counter 722 and the function of the processing unit 7 is stopped. The loading method will be described later. When microprogram loading to the microprogram storage 723 has been completed, the loading admission flag unit 725 is reset by a signal supplied from the outside. Thereby, the selector 726 is switched to supply the output of the microprogram counter 722 to the microprogram storage 723 and the clock admission switch 727 is turned on to cause the processing unit 7 to start the normal operation.

In the main memory unit 8, a battery 11 is provided to guard the memory contents even in the case of power failure. The main memory unit 8 includes a program storage 81 and a battery voltage detection circuit 82 for examining the charging state of the battery 11. The detection result of the battery voltage detection circuit 82 can be read out from the outside. The program storage 81 comprises a program area 811 for storing the system program and application program and a microprogram area 812 for storing the microprogram.. The main memory unit 8 itself is volatile. The read/write speed of the main memory unit 8 is slower than that of the microprogram storage 723, but is faster than that of the external memory unit 10.

The program transfer unit 9 comprises a transfer procedure ROM 91, a transfer circuit 92, and a selector 93. The transfer procedure ROM 91 is a read only memory in which the program loading procedure at the time of power restoration has been written beforehand. Even in the case of a failure of power supply, the written procedure is not destroyed. The loading procedure will be described later. Based upon the contents of the transfer procedure ROM 91, the transfer circuit 92 carries out loading of the program and microprogram. The selector 93 selects either the output of the external memory unit 10 or the output of the main memory unit 8 as the input to the transfer circuit 92. The selection directive has been written beforehand in the transfer procedure ROM 91 as a part of loading procedure.

Figure 4:
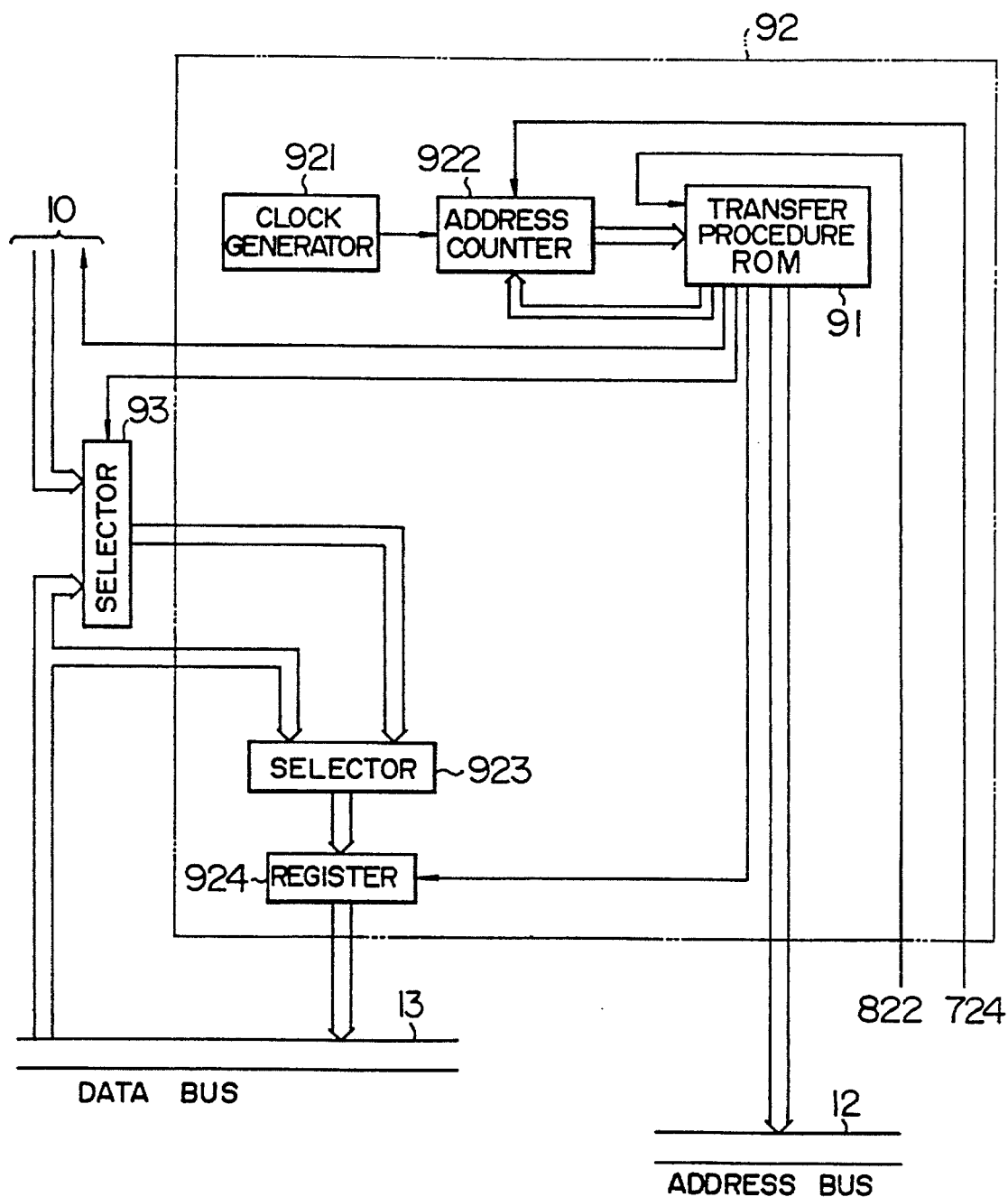
FIG. 4 shows the configuration of a transfer circuit included in the programmable controller of FIG. 3.

FIG. 4 shows the circuit configuration of the transfer circuit 92 included in the program transfer unit 9. A clock generator 921 generates clock pulses to transfer them to an address counter 922. The address counter 922 is activated to count clock pulses by a power restoration detection signal supplied from the power restoration detector 724 of the processing unit 7 and supplies an address signal to the transfer procedure ROM 91. In the processing of the program stored in the transfer procedure ROM 91, an address supplied from the transfer procedure ROM 91 is established in the address counter 922. A line for carrying a battery voltage abnormality signal is connected from the battery voltage detection circuit 82 to the transfer procedure ROM 91. Depending upon the presence or absence of the battery voltage abnormality detection signal, the transfer procedure ROM 91 controls the selector 93. When the battery voltage abnormality detection signal is not present, the data from the main memory unit 8 is supplied to the selector 923. When the signal is present, the data from the external memory unit 10 is supplied to the selector 923. When in the normal state the program stored in the main memory unit 8 is to be loaded into the microprogram storage 723 of the processing unit 7, the data from the main memory unit 8 is sent to a data bus 13 via a register 924 without being passed through the selector 923. In this case, the control operation for storing the data into a predetermined address of the microprogram storage 723 is effected by the processing unit 7, because the processing unit 7 is normal.

In case the battery voltage is not abnormal, that is to say, it is normal when the power restoration has been detected, the program is read out of the microprogram area 812 of the program storage 81, based upon an address designated by the transfer procedure ROM 91 through the transfer circuit 92 and the address bus 12. The program thus read out is set in the register 924 through the data bus 13, the selector 93, and the selector 923. On the basis of an address designated by the transfer procedure ROM 931 through the address bus, the program is stored into the designated address of the microprogram storage 723. When the battery voltage is abnormal, the program is read out from the external memory unit 10 into the register 924 through a cable 14, the selector 93, and the selector 923, on the basis of a readout instruction supplied from the transfer procedure ROM 91 to the external memory unit 10 through the cable 14. On the basis of an address supplied from the transfer procedure ROM 91 through the address bus 13, the program read out is stored into the designated location of the program storage 81. Thereafter, in the similar operation to that of the normal battery voltage case, the program is read out of the program storage 81 and is written into the microprogram storage 723.

The external memory unit 10 is a large capacity memory such as a magnetic memory tape, a flexible disk, or a fixed disk. Since mechanical parts are generally used, the external memory unit 10 can only be used in places with limited surroundings. And it is a rather expensive unit which operates with medium or low speed. Further, the external memory unit 10 can be detached from the program transfer unit 9. Original copies of the program and microprogram are stored into the external memory unit 10 beforehand.

The loading operation at the time of power restoration will now be described. The program for load processing is written in the transfer procedure ROM 91 beforehand. FIG. 5 shows a flow chart of load processing.

When power restoration has been detected by a power restoration detector 724 included in the processing unit 7, the microprogram storage 723 is made ready to be loaded from the outside. And the processing unit 7 is suspended in operation. The power restoration detector 724 starts the power restoration processing in the program transfer unit 9. The address counter 922 in the transfer circuit 92 begins counting. This corresponds to a "start" step shown in FIG. 5. The transfer circuit 92 derives the detection result from the battery voltage detection circuit 82 of the main memory unit 8 and confirms the battery operation.

If the battery voltage is normal, the program and microprogram which are the contents of the program storage 723 are normal. By sending address information to the main memory unit 8 through the transfer circuit 92 and the address bus I 2, the transfer procedure ROM reads out the microprogram and stores it in the register 924 included in the transfer circuit 92 through the data bus 13 and the selector 93. By sending then address information to the microprogram storage 723 through the transfer circuit 92 and the address bus 12, the transfer procedure ROM 91 writes the microprogram contained in the register 924 into the microprogram storage 723 through the data bus 13. Thereafter, the operation is repeated to load the microprogram. After the loading of the microprogram has been completed, the transfer procedure ROM 91 sends an instruction to the loading admission flag unit 725 through the transfer circuit 92 and data bus 13 to reset the unit 725 and make the processor unit 1 operate.

If a fault of the battery 11 is detected by the battery voltage detection circuit 82, the selector 93 is controlled by the transfer procedure ROM 91 so as to supply data from the external memory unit 10 to the transfer circuit 92. The original copies of the program and microprogram are read out of the external memory unit 10 word by word to be stored in the register 924 of the transfer circuit 92. By sending address information to the program storage 81 through the address bus 12, the transfer procedure ROM 91 writes the copies into the program storage 81. In the same way as the above described operation for normal battery voltage, loading the contents of the program storage 81 into the microprogram storage 723 is then effected to start the processing unit.

As described above, the microprogram loading is effected from the program storage 81 provided that the battery 11 is normal at the time of power restoration. Accordingly, loading can be conducted at high speed. In addition, the external memory unit 10 can be detached from the program transfer unit to be used for setting another controller to the ready state or to be moved to a place with good surroundings and held there in trust. If a fault is incurred in the battery 11 with the external memory unit 10 detached from the program transfer unit, the program and microprogram cannot be transferred from the external memory unit 10 and the connection of the external memory unit 10 is waited.

In the above described embodiment, the battery voltage detection circuit 82 has been used to determine whether the contents of the program storage 81 at the time of power restoration are normal or not. In an alternative embodiment, a predetermined pattern is stored in a predetermined location of the program storage 81 beforehand. And it is verified whether the pattern is memorized correctly instead of detecting the battery voltage.

While particular embodiments of the invention have been shown and described, it will be obvious to those skilled in the art that various changes and modifications may be made without departing from the present invention in its broader aspect,

We claim:

1. An information processing system, comprising:

a processing unit to which power is supplied for operation thereof and including a volatile first readable and writable memory unit for storing a microprogram, an arithmetic section for processing information under control of the microprogram stored in said first memory unit, and a power restoration detector for detecting when power is restored to the processing unit after power interruption;

an external memory unit in the form of a second, relatively low speed, readable and writable, nonvolatile, memory unit for storing the microprogram which is stored in said first memory unit;

a main memory unit including a volatile third readable and writable memory unit for storing the microprogram stored in said first memory unit and being connected to a backup battery, and detecting means for detecting loss of at least part of the microprogram stored in said third memory unit;

a program transfer unit responsive to said power restoration detector for transferring said microprogram from said main memory unit or said external memory unit to said processing unit for storage in said first memory unit when power is restored to said processing unit, including transfer control means responsive to said detecting means detecting a loss of at least part of the microprogram stored in said third memory unit for transferring said microprogram from said second memory unit to said first memory unit and for otherwise transferring said microprogram from said third memory unit to said first memory unit when said detecting means indicates that the microprogram stored in said third memory means is valid;

a bus having address lines and data lines interconnecting said processing unit, said main memory and said program transfer unit;

wherein said processing unit further includes a microprogram counter for generating access signals for accessing storage locations in said first memory unit to read out the microprogram in said first memory unit to said arithmetic section, a first selector for connecting either said microprogram counter or the address lines of said bus to said first memory unit, and said program transfer unit further includes a second selector for connecting either said second memory unit or third memory unit to said transfer control means.

2. A microprogram load unit comprising:

a first readable and writable microprogram memory unit for storing a microprogram, said first readable and writable microprogram memory unit being included in a central processor unit to which power is supplied for operation thereof and which includes first detecting means for detecting when said power is supplied thereto:

a second relatively low speed, readable and writable, nonvolatile, memory unit for storing said microprogram;

a third readable and writable memory unit for storing said microprogram and being provided with a backup battery, said third readable and writable memory unit being provided in the form of a volatile memory having an access speed which is significantly greater than the access speed of said second nonvolatile memory unit;

second detecting means for detecting loss of stored data in said third readable and writable memory unit; and a program transfer unit including means, responsive to an indication from said second detecting means as to whether or not data stored in said third readable and writable memory unit has been lost, when power to said central processor unit is turned on as indicated by said first detecting means, for reading said microprogram from said third readable and writable memory unit when data has not been lost therein and writing said microprogram into said first microprogram memory unit, and for reading said microprogram from said second nonvolatile memory unit when stored data has been lost in the third readable and writable memory unit and writing said microprogram into said first microprogram memory unit;

wherein said second detecting means detects a data loss when a predetermined data pattern stored at a certain fixed location within said third readable and writable memory unit has been lost.

3. An information processing system comprising:

a processing unit to which power is supplied for operation thereof and including a volatile first readable and writable memory unit for storing a microprogram, an arithmetic section for processing information under control of the microprogram stored in said first memory unit, and a power restoration detector for detecting when power is restored to the processing unit after power interruption;

an external memory unit in the form of a second, relatively low speed, readable and writable, nonvolatile, memory unit for storing the microprogram which is stored in said first memory unit;

a main memory unit including a volatile third readable and writable memory unit for storing the microprogram stored in said first memory unit and being connected to a backup battery, and detecting means for detecting loss of at least part of the microprogram stored in said third memory unit;

a program transfer unit responsive to said power restoration detector for transferring said microprogram from said main memory unit or said external memory unit to said processing unit for storage in said first memory unit when power is restored to said processing unit, including transfer control means responsive to said detecting means detecting a loss of at least part of the microprogram stored in said third memory unit for transferring said microprogram from said second memory unit to said first memory unit and for otherwise transferring said microprogram from said third memory unit to said first memory unit when said detecting means indicates that the microprogram stored in said third memory means is valid; and a bus having address lines and data lines interconnecting said processing unit, said main memory and said program transfer unit;

wherein said program transfer unit couples said external memory unit to said bus and includes a transfer circuit for temporarily storing said microprogram received from either said second memory unit or said third memory unit under control of said transfer control means.

4. An information processing system comprising:

a processing unit to which power is supplied for operation thereof and including a volatile first readable and writable memory unit for storing a microprogram, an arithmetic section for processing information under control of the microprogram stored in said first memory unit, and a power restoration detector for detecting when power is restored to the processing unit after power interruption;

an external memory unit in the form of a second., relatively low speed, readable and writable, nonvolatile, memory unit for storing the microprogram which is stored in said first memory unit;

a main memory unit including a volatile third readable and writable memory unit for storing the microprogram stored in said first memory unit and being connected to a backup battery, and detecting means for detecting loss of at least part of the microprogram stored in said third memory unit; and a program transfer unit responsive to said power restoration detector for transferring said microprogram from said main memory unit or said external memory unit to said processing unit for storage in said first memory unit when power is restored to said processing unit, including transfer control means responsive to said detecting means detecting a loss of at least part of the microprogram stored in said third memory unit for transferring said microprogram from said second memory unit to said first memory unit and for otherwise transferring said microprogram from said third memory unit to said first memory unit when said detecting means indicates that the microprogram stored in said third memory means is valid;

wherein said detecting means detects a loss of at least part of the microprogram stored in said third memory unit when a predetermined pattern at a fixed location in said microprogram as stored in said third memory unit is lost.

5. An information processing system comprising:

a processing unit to which power is supplied for operation thereof and including a volatile first readable and writable memory unit for storing a microprogram, an arithmetic section for processing information under control of the microprogram stored in said first memory unit, and a power restoration detector for detecting when power is restored to the processing unit after power interruption;

an external memory unit in the form of a second, relatively low speed, readable and writable, nonvolatile, memory unit for storing the microprogram which is stored in said first memory unit;

a main memory unit including a volatile third readable and writable memory unit for storing the microprogram stored in said first memory unit and being connected to a backup battery, and detecting means for detecting loss of at least part of the microprogram stored in said third memory unit; and a program transfer unit responsive to said power restoration detector for transferring said microprogram from said main memory unit or said external memory unit to said processing unit for storage in said first memory unit when power is restored to said processing unit, including transfer control means responsive to said detecting means detecting a loss of at least part of the microprogram stored in said third memory unit for transferring said microprogram from said second memory unit to said first memory unit and for otherwise transferring said microprogram from said third memory unit to said first memory unit when said detecting means indicates that the microprogram stored in said third memory means is valid;

wherein said transfer control means includes a transfer procedure read-only memory for storing a control program for controlling transfer of the microprogram from said second memory unit or said third memory unit to said first memory unit in response to said power restoration detector and said detecting means.

* * * * *